(12) United States Patent
Nachbar et al.

(10) Patent No.: US 11,956,380 B2
(45) Date of Patent: Apr. 9, 2024

(54) ENABLING AND DISABLING WIRELESS COMMUNICATION IN ELECTRONIC DEVICES

(71) Applicant: X Development LLC, Mountain View, CA (US)

(72) Inventors: Erich Karl Nachbar, Foster City, CA (US); Grant Alexander Uy, Sunnyvale, CA (US); Carl Turner, Eugene, OR (US)

(73) Assignee: X Development LLC, Moutain View, CA (US)

( * ) Notice: Subject to any disclaimer, the term of this patent is extended or adjusted under 35 U.S.C. 154(b) by 185 days.

(21) Appl. No.: 17/509,667

(22) Filed: Oct. 25, 2021

(65) Prior Publication Data

US 2022/0217232 A1 Jul. 7, 2022

Related U.S. Application Data

(60) Provisional application No. 63/134,794, filed on Jan. 7, 2021.

(51) Int. Cl.
*H04M 1/72463* (2021.01)
*H04M 1/72454* (2021.01)
(Continued)

(52) U.S. Cl.
CPC ... *H04M 1/72463* (2021.01); *H04M 1/72454* (2021.01); *H04W 4/027* (2013.01);
(Continued)

(58) Field of Classification Search
CPC ......... H04M 1/72463; H04M 1/72454; H04M 2250/10; H04M 2250/12; H04W 4/38; H04W 4/027; H04W 48/04; H04W 48/02
See application file for complete search history.

(56) References Cited

U.S. PATENT DOCUMENTS 9,126,693 B1 * 9/2015 Shi .......................... G05D 1/042
10,530,920 B1 * 1/2020 Jain ................... H04W 52/0274
(Continued)

FOREIGN PATENT DOCUMENTS

WO 2019234113 A1 12/2019

OTHER PUBLICATIONS

International Search Report and Written Opinion for Application No. PCT/US2021/061396 dated Feb. 25, 2022.
(Continued)

*Primary Examiner* — Ernest G Tacsik
(74) *Attorney, Agent, or Firm* — Botos Churchill IP Law LLP (57) ABSTRACT

Methods, systems, and apparatus, including computer programs encoded on computer storage media, for receiving, from one of two or more sensors of a device that independently determine whether an aircraft takeoff has likely occurred, an indication that the aircraft takeoff has likely occurred; activating, based on receiving the indication that the aircraft takeoff has likely occurred, an airplane mode of the device; receiving, while the device is in the airplane mode and from one of two or more other sensors of the device that independently determine that an aircraft flight is likely not occurring, an indication that the aircraft flight is likely not occurring; and deactivating, based on receiving the indication that the aircraft flight is likely not occurring, the airplane mode of the device. The indication that the aircraft takeoff has likely occurred may include acceleration data indicating an acceleration of the device in three dimensions.

19 Claims, 7 Drawing Sheets

(51) Int. Cl.
    *H04W 4/02*     (2018.01)
    *H04W 4/38*     (2018.01)
    *H04W 48/04*     (2009.01)

(52) U.S. Cl.
    CPC ............. *H04W 4/38* (2018.02); *H04W 48/04* (2013.01); *H04M 2250/10* (2013.01); *H04M 2250/12* (2013.01)

(56) References Cited

U.S. PATENT DOCUMENTS

| | | | |
|---|---|---|---|
| 10,629,067 B1* | 4/2020 | Komoni | G01S 5/0264 |
| 10,728,379 B1* | 7/2020 | Gupta | H04M 1/72454 |
| 11,588,932 B2 | 2/2023 | Coppin | |
| 2010/0267375 A1* | 10/2010 | Lemmon | G06F 21/74 |
| | | | 455/418 |
| 2014/0203970 A1* | 7/2014 | Taylor | G01C 21/183 |
| | | | 702/150 |
| 2014/0278220 A1* | 9/2014 | Yuen | A61B 5/681 |
| | | | 702/150 |
| 2016/0241707 A1* | 8/2016 | Lee | H04M 1/72454 |
| 2018/0335857 A1* | 11/2018 | Forsblom | G06Q 30/0241 |
| 2018/0338003 A1* | 11/2018 | Carlson | H04W 4/70 |
| 2019/0225332 A1* | 7/2019 | Burns | B64C 39/024 |
| 2021/0099839 A1* | 4/2021 | Chiu | G01S 5/02524 |
| 2021/0354849 A1* | 11/2021 | Kuzbari | B64D 45/00 |
| 2021/0400133 A1* | 12/2021 | Coppin | H04W 4/027 |
| 2023/0209312 A1 | 6/2023 | Coppin | |

OTHER PUBLICATIONS

"Runway Length Requirements for Airport Design", FAA Advisory Circular 150/5325-4B, Jul. 1, 2005.

Manos, "Gravity-Based Methods for Heading Computation in Pedestrian Dead Reckoning", Sensors, 2019, 19 Pages.

Pedley, "Tilt Sensing Using a Three-Axis Accelerometer", Freescale Semiconductor Application Note Document No. AN3461 Rev. 6, Mar. 2013, 22 Pages.

Vitali, et al., "Residual Linear Acceleration by Gravity Subtraction to Enable Dead-reckoning", DT0106 Design Tip, ST Life. Augmented, 2018, 6 Pages.

* cited by examiner

ENABLING AND DISABLING WIRELESS COMMUNICATION IN ELECTRONIC DEVICES

CROSS-REFERENCE TO RELATED APPLICATION

This application claims the benefit of U.S. Provisional Application No. 63/134,794, filed Jan. 7, 2021, the contents of which are incorporated by reference herein.

TECHNICAL FIELD

This specification relates generally to electronic devices having wireless communication capabilities.

BACKGROUND

Electronic devices may include wireless communication modules that enable one-way or two-way wireless communication with a communication network. Wireless communication may be undesirable in certain places where the wireless communication may cause electronic interference with sensitive equipment. For example, wireless communication may be prohibited in aerial vehicles such as airplanes.

SUMMARY

This specification describes techniques, methods, systems, and other approaches for enabling and disabling wireless communication in electronic devices. An electronic device may have a first mode, e.g., a normal mode, in which wireless communications are enabled, and a second mode, e.g., an airplane mode, in which certain wireless communications are disabled. The disclosed techniques can be used to switch from the normal mode to the airplane mode, and from the airplane mode to the normal mode, without user intervention.

Electromagnetic energy emitted by electronic devices with communications capabilities can interfere with sensitive electronics. For example, radio waves emitted by an electronic device can interfere with electronics used in aerial vehicles such as airplanes. Thus, when an electronic device is airborne, it is desirable for the device to autonomously inhibit transmitting and receiving electromagnetic signals. When the electronic device is no longer airborne, it is desirable for the device to autonomously enable transmitting and receiving electromagnetic signals.

Electronic devices can be used to track movement of objects. For example, an electronic device can include sensors that enable tracking of location and movement. The electronic device can be attached to an object, such as a shipping container, in order to enable tracking the shipping container. The electronic device can transmit its location and movement data, e.g., to a cloud server. The electronic device may communicate using one-way or two-way communications, e.g., using radio waves, satellite communications, cellular transmission, Bluetooth, Wi-Fi, etc.

A process of autonomously enabling and disabling wireless communication mode in electronic devices can include detecting airplane takeoffs and landings based on analyzing sensor data. When the electronic device detects an airplane takeoff, the electronic device can switch the communications mode from the normal mode to the airplane mode. When the electronic device detects an airplane landing, the electronic device can switch the communications mode from the airplane mode to the normal mode. The electronic device can detect airplane takeoffs and landings using sensors such as accelerometers, motion sensors, pressure sensors, gyroscopes, magnetometers, and GPS sensors. Each sensor can be configured to independently determine that a takeoff has likely occurred. Each sensor can also be configured to independently determine whether flight is likely occurring, or whether the aircraft is on the ground.

In general, innovative aspects of the subject matter described in this specification can be embodied in a method including actions of receiving, from one of two or more sensors of a device that independently determine whether an aircraft takeoff has likely occurred, an indication that the aircraft takeoff has likely occurred; activating, based on receiving the indication that the aircraft takeoff has likely occurred, an airplane mode of the device; receiving, while the device is in the airplane mode and from one of two or more other sensors of the device that independently determine that an aircraft flight is likely not occurring, an indication that the aircraft flight is likely not occurring; and deactivating, based on receiving the indication that the aircraft flight is likely not occurring, the airplane mode of the device.

These and other implementations can include the following features, alone or in combination. In some implementations, receiving, from the one of two or more sensors of the device, the indication that the aircraft takeoff has likely occurred includes: receiving, from an accelerometer, acceleration data; analyzing the acceleration data; and based on analyzing the acceleration data, determining that the aircraft takeoff has likely occurred.

In some implementations, the acceleration data indicates an acceleration of the device in each of three dimensions relative to an orientation of the device.

In some implementations, analyzing the acceleration data includes: transforming the acceleration data from acceleration data that indicates the acceleration of the device in each of three dimensions relative to the orientation of the device to acceleration data that indicates the acceleration of the device in each of three dimensions relative to the direction of gravity.

In some implementations, determining that the aircraft takeoff has likely occurred includes: determining, based on analyzing the acceleration data, that a variance of acceleration of the device in a first dimension meets criteria for an aircraft takeoff.

In some implementations, the first dimension is parallel to the direction of gravity.

In some implementations, determining that the aircraft takeoff has likely occurred includes: determining, based on analyzing the acceleration data, that a magnitude of acceleration of the device in a plane orthogonal to the first dimension meets criteria for an aircraft takeoff.

In some implementations, activating the airplane mode of the device includes switching a communication module of the device from a first mode to a second mode. During the first mode the communication module is enabled to perform certain wireless communications. During the second mode the communication module is disabled to perform the certain wireless communications.

In some implementations, receiving, from the one of two or more other sensors of the device, the indication that the aircraft flight is likely not occurring includes: receiving, from a motion sensor, motion sensor data; analyzing the motion sensor data; and based on analyzing the motion sensor data, determining that the aircraft flight is likely not occurring.

In some implementations, analyzing the motion sensor data includes: determining, based on the motion sensor data, an average motion of the device over a programmed period of time; and determining that the average motion of the device over the programmed period of time does not meet criteria for an aircraft flight occurring.

In some implementations, receiving, from the one of two or more other sensors of the device, the indication that the aircraft flight is likely not occurring includes: receiving, from a GPS receiver, GPS position data; analyzing the GPS position data; and based on analyzing the GPS position data, determining that the aircraft flight is likely not occurring.

In some implementations, analyzing the GPS position data includes: determining, based on the GPS position data, a velocity of the device; and determining that the velocity of the device does not meet criteria for an aircraft flight occurring.

The present disclosure also provides a device including: a communication module configured to permit wireless communications between the device and a communication network; two or more sensors that are configured to independently determine whether an aircraft takeoff has likely occurred; two or more other sensors that are configured to independently determine that an aircraft flight is likely not occurring; and a controller configured to perform operations in accordance with implementations of the methods provided herein.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The subject matter described in this specification can be implemented in various embodiments and may result in one or more of the following advantages. Activating an airplane mode based on detecting an airplane takeoff using one of two or more sensors can reduce the likelihood of false positive airplane mode entry. A false positive airplane mode entry can occur when the electronic device enters airplane mode when the electronic device is not on an airborne aircraft. For example, a false positive airplane mode entry can occur when the electronic device enters airplane mode when the electronic device is located on a train or a truck. Similarly, deactivating an airplane mode based on determining that airplane flight is likely not occurring using one of two or more sensors can reduce the likelihood of improperly failing to exit airplane mode. For example, after a landing occurs, the electronic device should exit airplane mode to enable transmitting and receiving electromagnetic signals in order to perform real-time tracking of the electronic device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
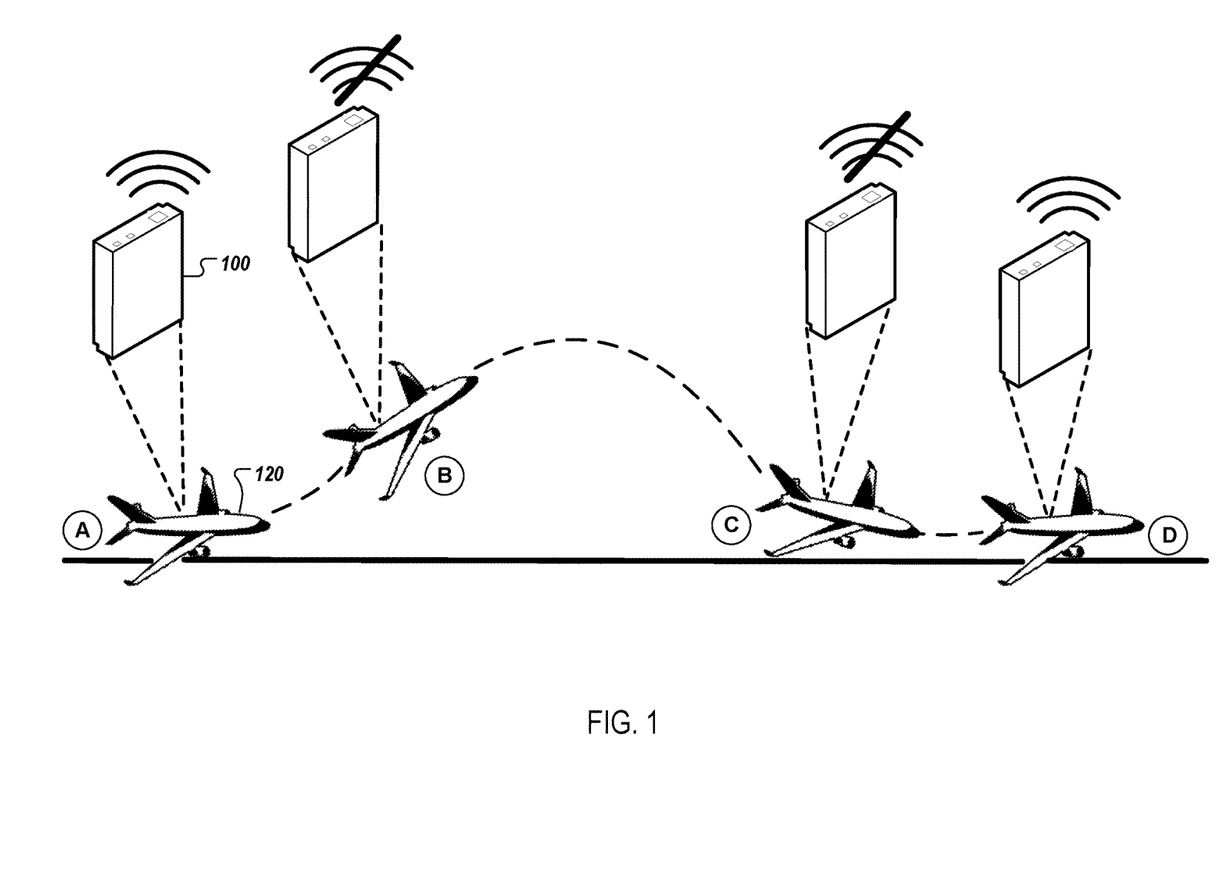
FIG. 1 shows an example electronic device that disables and enables wireless communication while located in an airplane that launches and lands.

FIG. 1 shows an example electronic device 100 that disables and enables wireless communication while located in an aerial vehicle while the aerial vehicle launches and lands. The electronic device 100 can be, for example, an asset tracking device, a smart phone, a smart watch, or a tablet computer. The aerial vehicle can be a manned or unmanned aerial vehicle, such as an airplane 120.

When the communications module of the electronic device 100 emits electromagnetic energy, e.g., radio frequency energy, the emissions can interfere with electronics of the airplane 120. The electronic device 100 can detect when the airplane 120 launches. In response to detecting the airplane 120 launching, the electronic device can disable wireless communications by switching from a first mode that allows wireless communications to a second mode, e.g., an airplane mode that does not allow certain wireless communications. For example, in the second mode, NFC and Bluetooth communications may be enabled, while radio and cellular communications may be disabled. The electronic device 100 can also detect when the airplane 120 lands. In response to detecting the airplane 120 landing, the electronic device can enable wireless communications by switching from the airplane mode to the first mode.

At Stage (A) of FIG. 1, the airplane 120 is on the ground, and the airplane mode of the electronic device 100 is off. At Stage (B), the airplane 120 takes off. The electronic device 100 determines that the airplane 120 has taken off, and switches the airplane mode on. At Stage (C), airplane mode remains on as the airplane 120 lands at its destination. At Stage (D), the airplane 120 slows to a stop on the ground. The electronic device 100 determines that the airplane 120 has slowed, and switches the airplane mode off.

Figure 2:
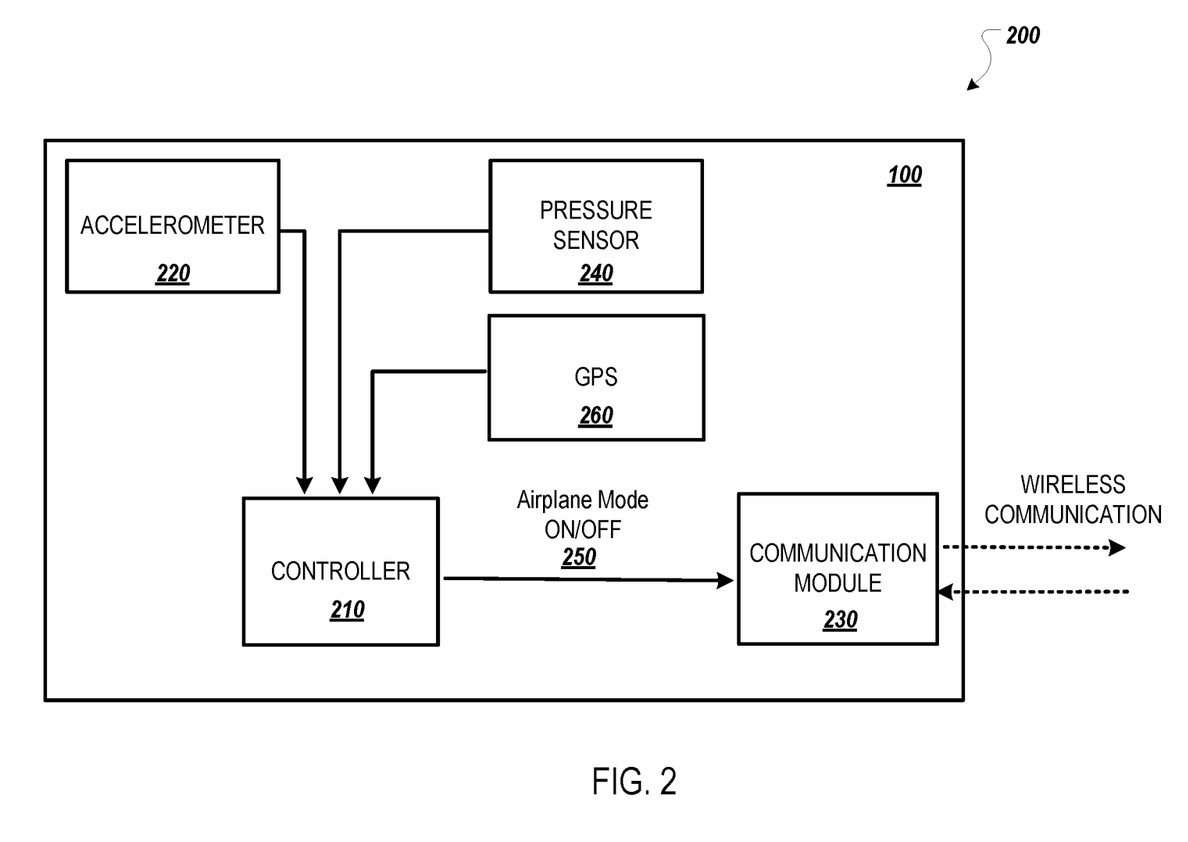
FIG. 2 is a block diagram of the example electronic device of FIG. 1.

FIG. 2 is a block diagram of the example electronic device 100 of FIG. 1. The electronic device 100 includes a controller 210. The controller 210 can receive data input from sensors of the device. Sensors can include, for example, an accelerometer 220, a pressure sensor 240, and a GPS receiver 260. The controller 210 can activate or deactivate 250 the airplane mode by switching airplane mode on or off. The communication module 230 can include a transmitter, a receiver, or both. The communication module 230 can communicate wirelessly with a communication network.

The communication module 230 may transmit and receive electromagnetic energy, e.g., radio waves, cellular communication signals, satellite communication signals, Wi-Fi, Bluetooth, etc.

The accelerometer 220 can be, for example, a three-axis inertial measurement unit. The acceleration can output acceleration data indicating the acceleration of the device in each of three dimensions.

When the electronic device 100 is stationary, the device can be calibrated to determine the orientation of the device 100 based on accelerometer measurements. For example, by determining the amount of acceleration due to gravity in each of the three axis of the accelerometer, the controller 210 can determine the angle that the sensor body is tilted at with respect to the earth.

In some examples, the device 100 may recalibrate its orientation periodically. In some examples, the device 100 may recalibrate in response to an event. For example, the device 100 may recalibrate in response to accelerometer data indicating that the orientation of the device 100 has changed.

In some examples, the device 100 may recalibrate in response to detecting that the device 100 has become stationary, or has remained stationary for at least a programmed amount of time. When the device is detected to be stationary, the controller 210 can create a rotation matrix to be used to compute, when in motion, the world frame reference from the sensor body accelerometer data. In some examples, the controller assumes the orientation of the device 100 with respect to gravity does not significantly change between a stationary event and an airplane takeoff. Thus, after calibrating the device based on accelerometer data, the controller 210 can receive sensor body measurements from the accelerometer 220, and rotate the measurements to the world frame reference. The controller 210 can then analyze the accelerometer data with respect to the world frame reference to determine if the accelerometer variance, magnitude, or both, meet criteria for an airplane takeoff.

In some implementations, quaternions can be used for efficient implementation of the algorithm. Rotation quaternions can be used to represent four-dimensional rotation calculations. Therefore, quaternion calculations can be used instead of rotational matrices to represent the orientation of the accelerometer and rotation of the axes.

Implementation with quaternions may result in several advantages compared to rotational matrices. In some examples, quaternions can result in faster computations and non-ambiguous interpolation of rotations. Quaternions also may use less memory than rotational matrices, since a quaternion includes four values instead of nine values.

Another advantage that may be achieved through quaternion implementation is that quaternion calculations are stable regardless of angle. Thus it may be advantageous to derive the rotation matrix from a quaternion rather than from trigonometric functions in order to reduce the likelihood of mathematical instabilities that may occur when rotation axes align with gravity.

The pressure sensor 240 provides pressure sensor data to the controller 210. The pressure sensor data includes an air pressure at the location of the device 100. The controller can receive the pressure sensor data from the pressure sensor 240 and, based on the pressure sensor data, determine whether the pressure of the device meets criteria for airplane takeoff. For example, air pressure within an airplane during takeoff may decrease gradually over time during takeoff. The controller 210 can analyze the pressure sensor data to determine if the pressure variance, pressure rate of change, or both, meet criteria for an airplane takeoff.

The controller 210 can determine whether an airplane takeoff is occurring, or has occurred, based on the accelerometer data, pressure sensor data, or both. In response to determining that an airplane takeoff has occurred, the controller 210 can activate 250 airplane mode, e.g., by enabling or disabling the communication module 230.

The communication module 230 can include an emitter, a receiver, or both. In operation, the emitter emits electromagnetic energy, and the receiver receives electromagnetic energy. In some examples, the communication module 230 can emit and receive electromagnetic energy in a range of bands of the electromagnetic spectrum, such as in various radio frequency bands of the electromagnetic spectrum.

The controller 210 can control the mode of the communication module 230. The controller 210 can send signal to the communication module 230 to activate or deactivate 250 airplane mode. With airplane mode deactivated, or off, wireless communications from the communication module 230 are enabled. With airplane mode activated, or on, certain wireless communications from the communication module 230 are disabled.

The GPS receiver 260 provides GPS data to the controller 210. The GPS data includes a GPS location of the device 100. The GPS data can also provide data to the controller 210 indicating a velocity of the device 100. In some examples, the GPS receiver 260 may be permitted to receive satellite signals while the device 100 is in airplane mode, as the GPS receiver does not emit radio frequency energy.

The controller 210 can receive the GPS data from the GPS receiver 260 and, based on the GPS data, determine whether the velocity of the device 100 meets criteria for airplane flight. For example, the controller 210 may determine that the device 100 is stationary, or that the velocity of the device 100 is below a threshold velocity. Based on determining that the velocity of the device is below the threshold velocity, the controller 210 can determine that the device 100 is likely not located on an airplane that is in flight. In response to determining that the device 100 is likely not located on an airplane that is in flight, the controller 210 can deactivate 250 airplane mode.

Figure 3:
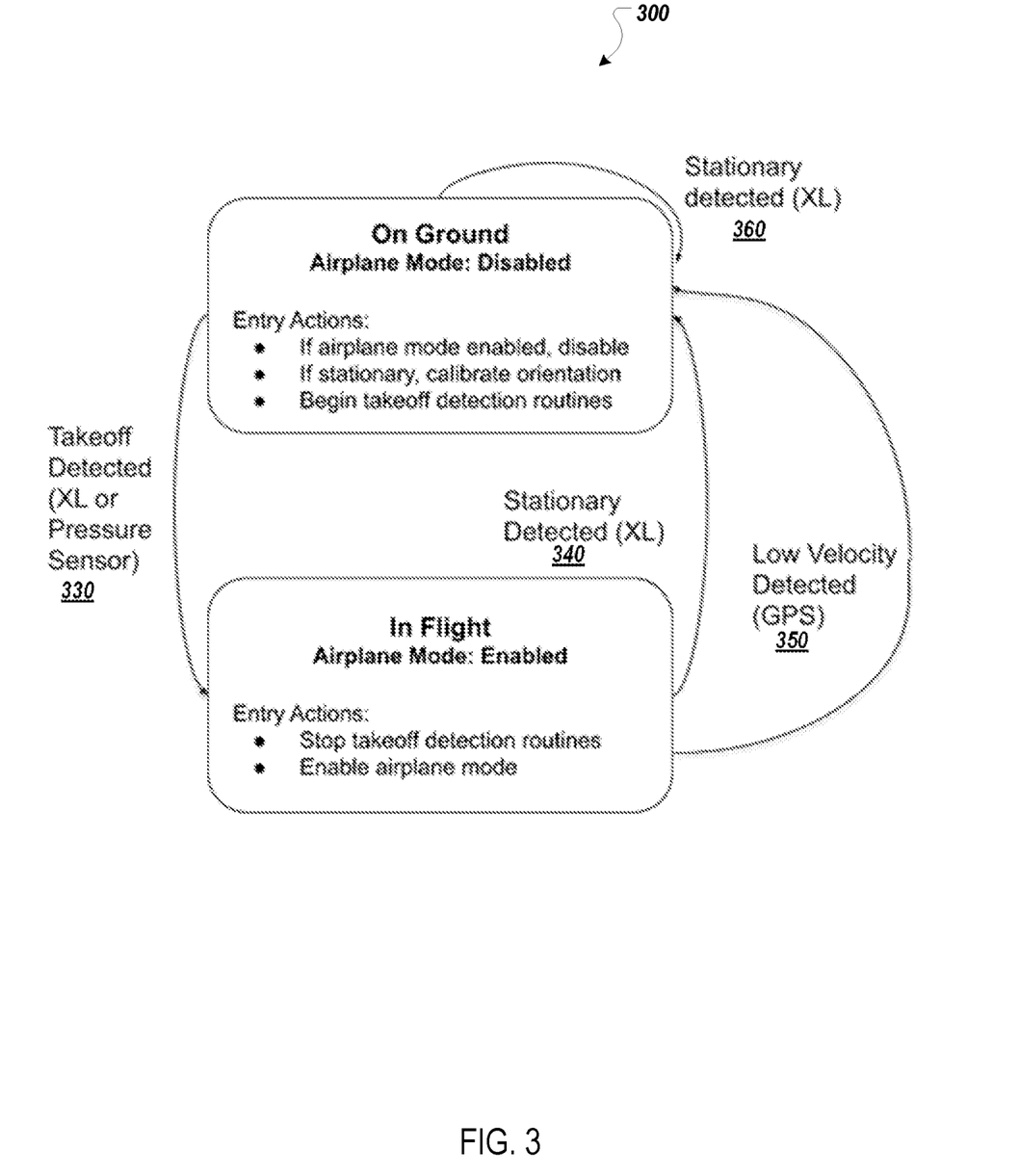
FIG. 3 is a flow diagram of an example process for enabling and disabling wireless communication in an electronic device.

FIG. 3 is a flow diagram of an example process 300 for enabling and disabling wireless communication in an electronic device. As shown in FIG. 3, when the electronic device detects that the airplane is on the ground 310, airplane mode is disabled, and the device operates in a normal mode.

Two or more sensors can be used to independently detect airplane takeoff. In the example of FIG. 3, an accelerometer and a pressure sensor are each configured to independently detect airplane takeoff. When takeoff is detected using data from either of the sensors, the device will shut off any transmitting radios and not turn on any transmitting radios. This state is known as airplane mode.

Sensor independence provides robustness against sensor failures. For example, if the accelerometer fails to detect the airplane takeoff, the pressure sensor may still detect the airplane takeoff, preventing a false negative detection. The sensor independence also provides robustness against false negatives in situations with unusual acceleration and pressure conditions. For example, if the pressure sensor fails to detect an airplane takeoff from a region at high altitude, the accelerometer may still detect the airplane takeoff, preventing the false negative detection.

The electronic device 100 may detect takeoff 330 based on data from the accelerometer, the pressure sensor, or both.

When the electronic device detects takeoff, the electronic device 100 determines that the airplane is in flight 320 and enables airplane mode. Upon entering airplane mode, the electronic device performs airplane mode entry actions. The airplane mode entry actions include stopping takeoff detection routines and enabling airplane mode.

After the airplane has taken off, the device will not exit airplane mode until after the aircraft has landed and the electronic device has detected that the airplane is once again on the ground 310. Two or more sensors on the device can be used to independently exit airplane mode. In the example of FIG. 3, an accelerometer and a GPS receiver are each configured to independently detect when the airplane is on the ground.

The electronic device may detect that the airplane is on the ground based on data from the accelerometer indicating that the electronic device is stationary 340. The accelerometer 220 can include a motion detector that can determine whether the device is moving or is stationary. When the device is in flight, normal turbulence causes the accelerometer to move, and the accelerometer data will likely indicate consistent movement. When the device is no longer in flight, e.g., when the device is on a stationary grounded airplane, the accelerometer comes to rest, and the accelerometer data will likely indicate that the device is stationary. After a programmed period of time during which the device is stationary, the controller may determine that the airplane flight is not occurring, e.g., that the airplane is on the ground.

The electronic device may also detect that the airplane is on the ground based on data from the GPS sensor indicating that the electronic device is moving at a low velocity 350. When the accelerometer detects that the device is stationary or the GPS detects that the device is moving slowly, the device will exit airplane mode and resume its normal operation. Upon disabling airplane mode, the electronic device performs ground entry actions. The ground entry actions include calibrating the orientation of the electronic device if the electronic device is stationary, and beginning takeoff detection routines.

Figure 4:
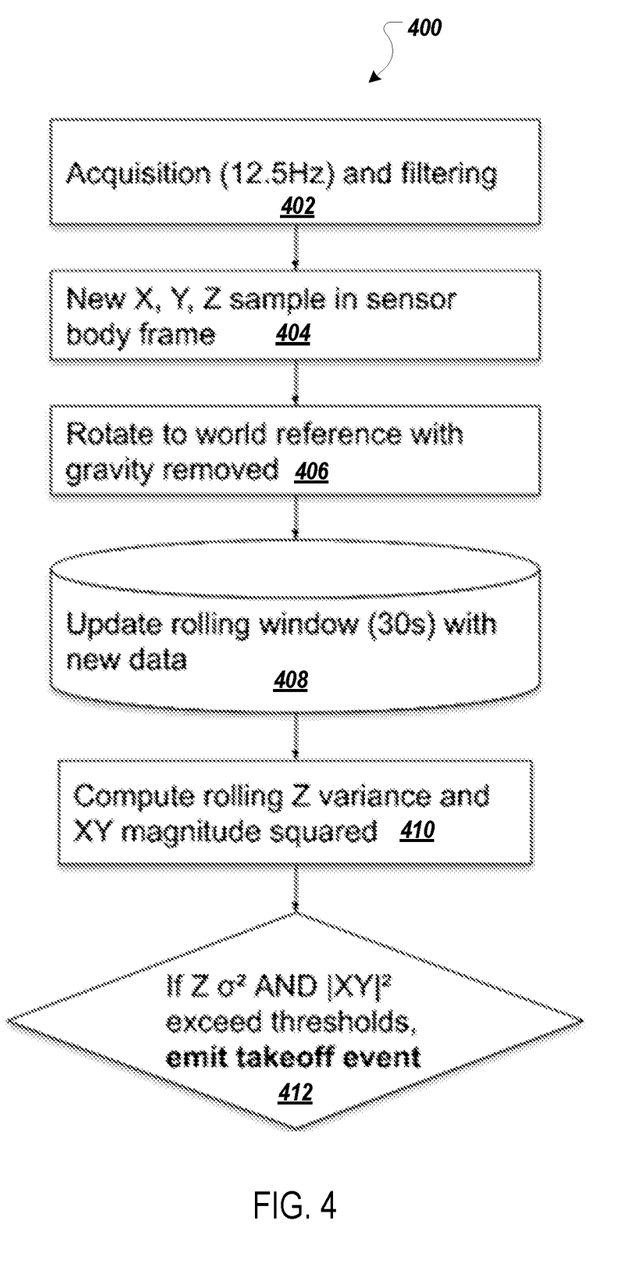
FIG. 4 is a flow diagram of an example process for detecting takeoff of an airplane using an accelerometer.

FIG. 4 is a flow diagram of an example process 400 for detecting takeoff of an airplane using an accelerometer. The process 400 can be used to detect a takeoff event of an airplane where an electronic device is located. In response to detecting the takeoff event, the electronic device can enable airplane mode.

The device can detect a takeoff event based on analyzing three-axis accelerometer data over a programmed time period, e.g., thirty seconds. Accelerometer data during airplane takeoff can exhibit high variance in the direction of gravity, and high magnitude in the plane perpendicular to gravity. The controller of the device can analyze the accelerometer data to determine if the accelerometer data meets criteria for an airplane takeoff event.

In some examples, criteria for an airplane takeoff event can include a threshold variance of acceleration along the Z-axis, e.g., the direction of gravity. In some examples, the criteria for an airplane takeoff event can include a threshold magnitude of acceleration in the XY-plane, e.g., the plane perpendicular to the direction of gravity.

In some examples, the controller can determine that the three-axis accelerometer data meets criteria for an airplane takeoff event using a machine learning method. For example, a machine learning model can be trained using accelerometer data from a large number of airplane takeoff events. The accelerometer data can be provided to the trained machine learning model. The machine learning model can then output a determination of whether the accelerometer data represents an airplane takeoff event.

The process 400 can be performed by a computing system, e.g., the controller of electronic device 100. The process 400 includes acquiring and filtering accelerometer data (402). The accelerometer data can be acquired from the accelerometer at a continuous sampling frequency. For example, the accelerometer data can be acquired at a frequency of 12.5 Hz or 26.0 Hz.

The process 400 includes obtaining a new sample of accelerometer data in three dimensions (X, Y, Z) with respect to the sensor body frame (404). For example, each sample of accelerometer data can include acceleration in each of the X, Y, and Z directions with respect to the body frame of the accelerometer.

Figure 5A:
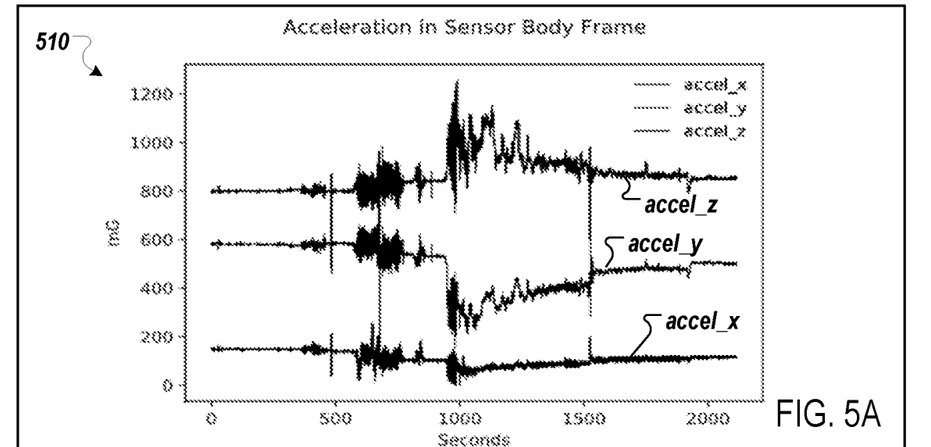
FIG. 5A is an example graph of acceleration in three dimensions with reference to an accelerometer body frame during airplane takeoff.

FIG. 5A is an example graph 510 of acceleration in three dimensions, with reference to an accelerometer body frame, as can be acquired in step 404. As shown in FIG. 5A, the takeoff signatures from the horizontal XY accelerations differ from the vertical Z accelerations. During takeoff, there is a large initial horizontal acceleration in the XY plane, particularly in the Y direction. The acceleration in the vertical Z direction increases in variance during takeoff. This is due to moments of lift followed by downward motion, followed by lift off. Typically the airflow is most turbulent near the ground. Thus, there is a large vertical acceleration variance during liftoff. Although accelerometer data will vary for different types of aircraft and for different environmental conditions, high variance in vertical acceleration and high acceleration magnitude in the XY plane will be common to most airplane takeoffs.

Figure 5B:
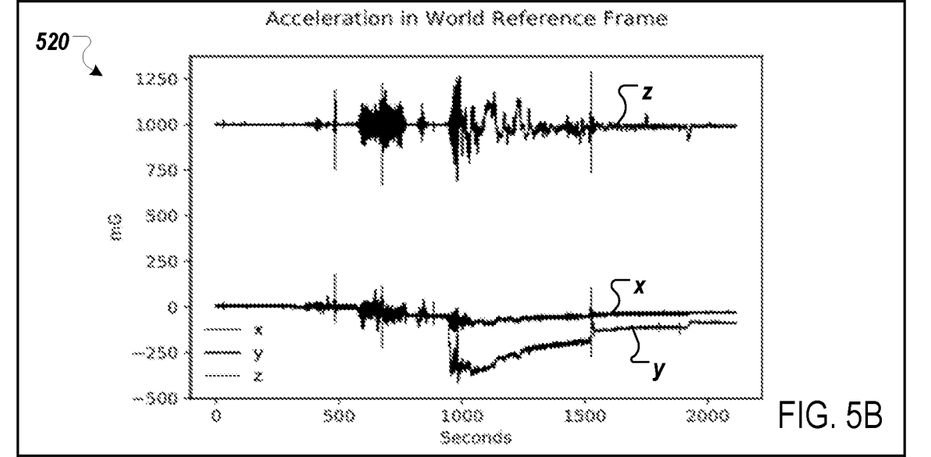
FIG. 5B is an example graph of acceleration data in three dimensions with reference to a world frame during airplane takeoff.
Figure 5C:
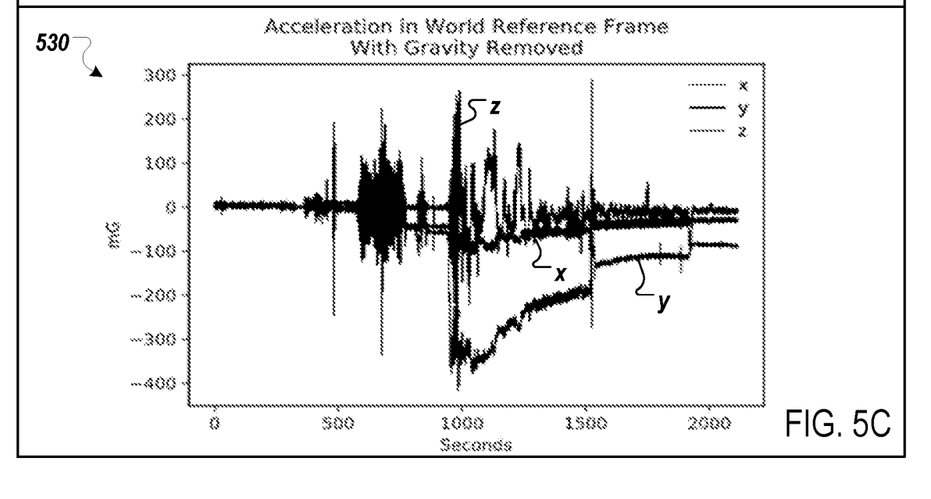
FIG. 5C is an example graph of acceleration in three dimensions with reference to a world frame during airplane takeoff, with gravity removed.

The process 400 includes rotating the accelerometer data to the world reference with gravity removed (406). For example, the controller can use the rotation matrix, created during calibration, to rotate the accelerometer data to the world reference. FIG. 5B is an example graph 520 of acceleration in three dimensions with reference to a world frame during airplane takeoff. As shown in FIG. 5B, after rotating to the world frame, acceleration due to gravity is only apparent in the Z-direction. The controller can then subtract out the acceleration due to gravity. FIG. 5C is an example graph 530 of acceleration in three dimensions with reference to a world frame with gravity removed, as can be determined in step 406.

The process 400 includes updating the rolling window with new data (408). The rolling window can be, for example, a time window of thirty seconds. By analyzing accelerometer data over a rolling time window, noise effects can be reduced.

Figure 5D:
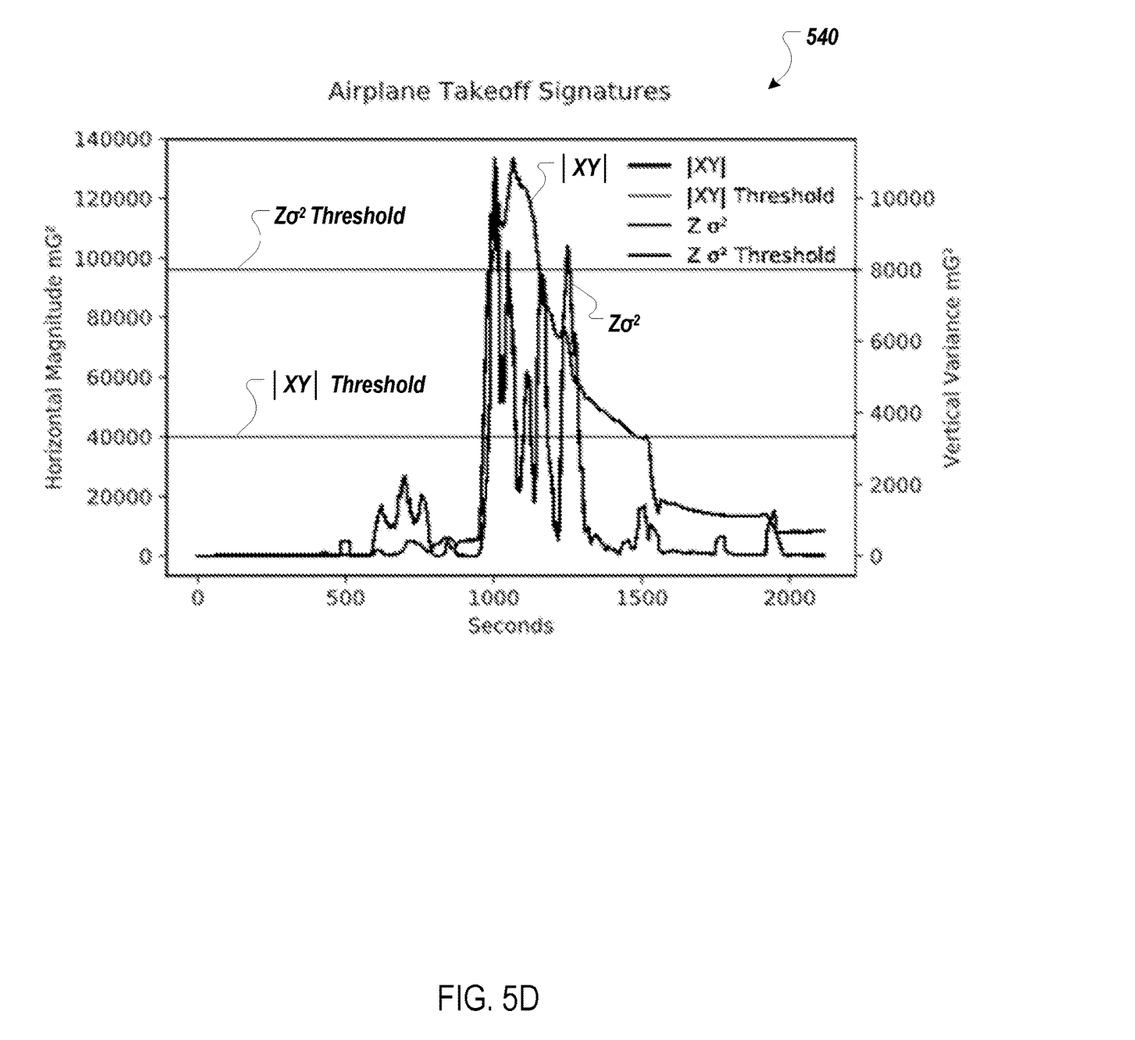
FIG. 5D is an example graph of acceleration variance and magnitude during airplane takeoff.

The process 400 includes computing rolling Z variance and XY magnitude squared (410). The Z variance and XY magnitude square can be calculated on a rolling basis based on data obtained over the rolling time window. For example, the controller can compute the variance of acceleration in the Z-direction during the time window. The controller can also compute the average squared magnitude of acceleration in the XY plane during the time window. The magnitude of acceleration in the XY plane can be computed by summing the magnitudes of acceleration in the X and Y directions. FIG. 5D is an example graph 540 of vertical acceleration variance, and of squared horizontal magnitude, during airplane takeoff, as can be computed in step 410. FIG. 5D also illustrates an example horizontal acceleration magnitude threshold, and an example vertical variance threshold.

The process 400 includes determining whether the rolling Z variance and the XY magnitude squared meet takeoff criteria. The criteria can include threshold values of rolling Z variance and the XY magnitude squared. As shown in FIG. 5D, an example threshold value of rolling Z variance may be 8,000 square milligravities ($mG^2$) and an example threshold value of XY magnitude squared may be 4000 $mG^2$. If the rolling Z variance and the XY magnitude squared exceed threshold values, the system emits a takeoff event 412.

Figure 6:
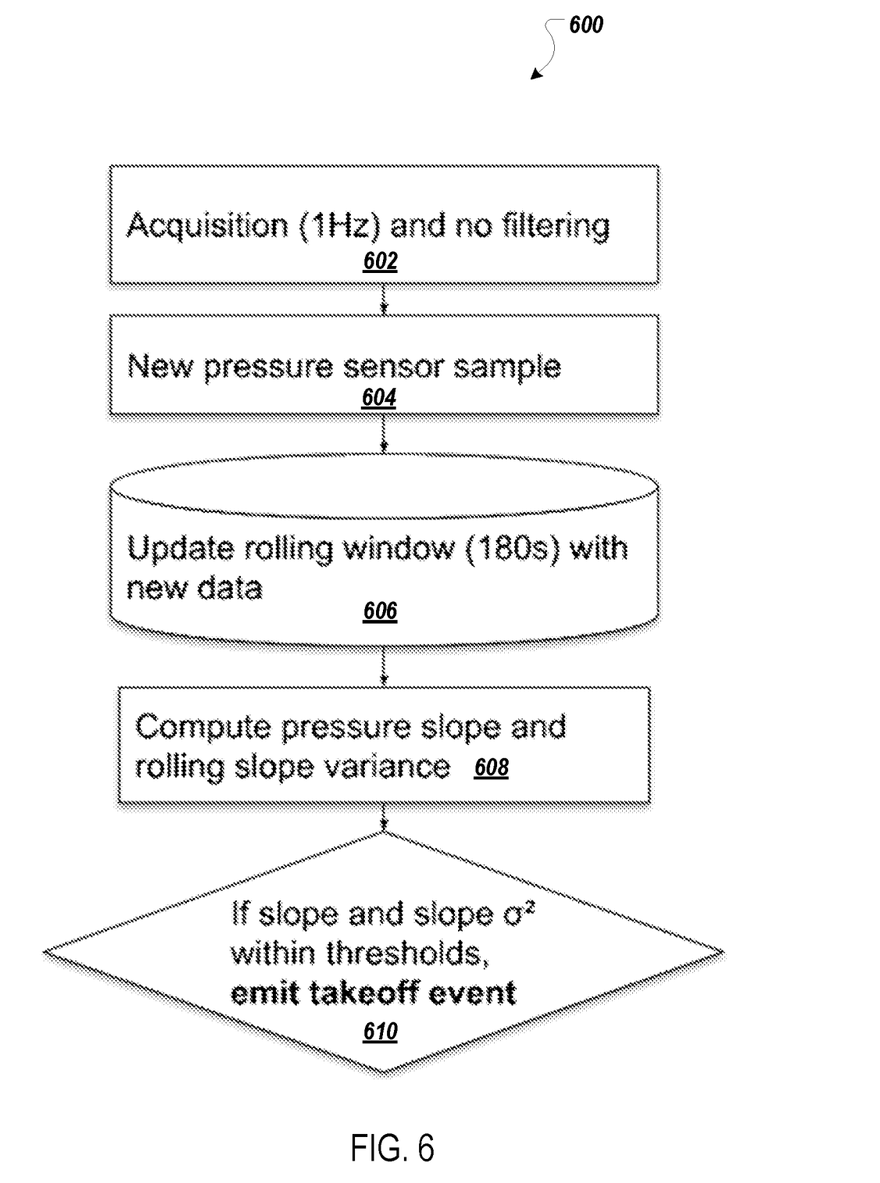
FIG. 6 is a flow diagram of an example process for detecting takeoff of an airplane using a pressure sensor.

FIG. 6 is a flow diagram of an example process 600 for detecting takeoff of an airplane using a pressure sensor. The process 600 can be used to detect a takeoff event of an airplane where an electronic device is located. In response to detecting the takeoff event, the electronic device can enable airplane mode.

During airplane takeoff, airplane cabin pressure is typically artificially controlled, causing pressure to change at a slow rate. For example, pressure may be controlled so that the rate of change is less than 2.0 kilopascals (kPa) per minute or less than 3.0 kPa per minute. Additionally, during airplane takeoff, cabin pressure typically changes at a consistent rate for an extended period of time, e.g., three minutes, ten minutes, or fifteen minutes. Therefore, the controller of the electronic device can detect an airplane takeoff based on pressure data that indicates a slow, consistent change in pressure that lasts longer than a threshold amount of time. For example, the electronic device may be configured to detect an airplane takeoff based on pressure data that indicates steady decreasing pressure at a rate between 0.42 kPa per minute and 2.40 kPa per minute (e.g., between 7 Pascals (Pa) per second and 40 Pa per second).

The process 600 can be performed by a computing system, e.g., the controller of electronic device 100. The process 600 includes acquiring pressure sensor data (602). The pressure sensor data can be acquired, for example at a frequency of 1.0 Hz.

The process 600 includes obtaining a new sample of pressure sensor data (604). The new sample of pressure sensor data can include a pressure of air at the location of the device.

The process 600 includes updating the rolling window with new data (606). The rolling window can be, for example, a time window of one hundred-eighty seconds. The time window can be set to a value that reduces false positive detections. For example, the time window can be set to an amount of time that is greater than a typical elevator climb.

The process 600 includes computing pressure slope and rolling slope variance (608). The pressure slope and rolling slope variance can be calculated on a rolling basis based on data obtained over the rolling time window. Pressure slope indicates a rate of change of the pressure. Pressure variance indicates a consistency of the pressure rate of change.

The process 600 includes determining whether the pressure slope and rolling slope variance meet takeoff criteria. The criteria can be, for example, threshold values of pressure slope and rolling slope variance. If the pressure slope and rolling slope variance are within threshold values, the system emits a takeoff event (610). Pressure slope being below a threshold value can indicate a slow decrease in pressure caused by air cabin pressure control during airplane takeoff Pressure slope variance being below a threshold value can indicate a consistent decrease in pressure caused by air cabin pressure control during the airplane takeoff.

The threshold values of pressure slope and of pressure slope variance can be tuned to reduce false positive detections. For example a climbing elevator will experience a decrease in air pressure as it rises. However, the rate of change of pressure for the elevator will likely be inconsistent due to the elevator stopping at different floors. Additionally, the elevator is unlikely to steadily climb for greater than one hundred-eighty seconds. Therefore, the pressure slope variance of the elevator will be greater than the pressure slope variance of the airplane takeoff. The pressure slope variance threshold can thus be set to a value that reduces the likelihood of false positive detections in an elevator.

Embodiments of the subject matter and the functional operations described in this specification can be implemented in any suitable electronic device such as a GPS tracking device, a personal computer, a mobile telephone, a smart phone, a smart watch, a smart TV, a mobile audio or video player, a game console, a tablet computer, or a combination of one or more of these devices.

The electronic device may include various components such as a memory, a processor, a display, and input/output units. The input/output units may include, for example, a transceiver that can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
receiving, by one or more processors of a device from two or more sensors of the device a first indication that an aircraft on which the device is aboard has taken off, wherein the two or more sensors of the device include an accelerometer;
transforming, by the one or more processors, acceleration data from the accelerometer that is indicative of an acceleration of the device in three dimensions relative to an orientation of the device to being indicative of the acceleration of the device in the three dimensions relative to a direction of gravity;
responsive to transforming the acceleration data and receiving the first indication, activating, by the one or more processors, an airplane mode of the device;
receiving, by the one or more processors from the two or more sensors of the device while the device is in the airplane mode a second indication that the aircraft is not in flight; and
responsive to receiving the second indication, deactivating, by the one or more processors, the airplane mode of the device.

2. The method of claim 1, wherein receiving the first indication includes:
analyzing, by the one or more processors, the acceleration data; and
based on analyzing the acceleration data, determining, by the one or more processors, that the aircraft has taken off.

3. The method of claim 2, wherein determining that the aircraft has taken off includes:
determining, by the one or more processors based on analyzing the acceleration data, that a variance of an acceleration of the device in a dimension indicates that the aircraft has taken off.

4. The method of claim 3, wherein the dimension is parallel to the direction of gravity.

5. The method of claim 3, wherein determining that the aircraft has taken off includes:
determining, by the one or more processors based on analyzing the acceleration data, that a magnitude of the acceleration of the device in a plane orthogonal to the dimension indicates that the aircraft has taken off.

6. The method of claim 1, wherein activating the airplane mode of the device includes:
switching, by the one or more processors, a communication module of the device from operating in a first mode to operating in a second mode, wherein certain wireless communications of the communication module is enabled in the first mode, and wherein the certain wireless communications of the communication module is disabled in the second mode.

7. The method of claim 1, wherein receiving the second indication includes:
receiving, by the one or more processors from a motion sensor of the device, motion sensor data;
analyzing, by the one or more processors, the motion sensor data, the analyzing including:
determining, based on the motion sensor data, an average amount of motion of the device over a programmed period of time; and
determining whether the average amount of motion of the device over the programmed period of time indicates that the aircraft is not in flight; and
based on analyzing the motion sensor data, determining that the aircraft is not in flight.

8. The method of claim 1, wherein receiving the second indication includes:
   receiving, by the one or more processors from a GPS receiver, GPS position data;
   analyzing, by the one or more processors, the GPS position data; and
   based on analyzing the GPS position data, determining, by the one or more processors, that the aircraft is not in flight.

9. The method of claim 8, wherein analyzing the GPS position data comprises:
   determining, by the one or more processors based on the GPS position data, a velocity of the device; and
   determining whether the velocity of the device is indicative of the aircraft is not in flight.

10. A device comprising:
   a communication module configured to communicate wirelessly with a communication network;
   two or more sensors configured to:
      independently indicate whether an aircraft on which the device is aboard has taken off; and
      independently indicate whether the aircraft is not in flight; and
   a controller coupled to the communication module and the two or more sensors, and configured to:
      receive, from the two or more sensors, a first indication that the aircraft has taken off;
      activate, in response to receipt of the first indication, an airplane mode of the communication module;
      receive, while the airplane mode of the communication module is active and from the two or more sensors, a second indication that the aircraft is not in flight; and
      in response to receipt of the second indication:
         deactivate, the airplane mode of the communication module; and
         calibrate an orientation of the device.

11. The device of claim 10, wherein:
   the two or more sensors include an accelerometer, and
   the controller is further configured to:
      receive, from the accelerometer, acceleration data;
      analyze the acceleration data; and
      based on the analysis of the acceleration data, determine whether the aircraft has taken off.

12. The device of claim 11, wherein the acceleration data is indicative of an acceleration of the device in three dimensions relative to an orientation of the device.

13. The device of claim 12, wherein the controller is further configured to:
   transform the acceleration data from being indicative of the acceleration of the device in the three dimensions relative to the orientation of the device to being indicative of the acceleration of the device in the three dimensions relative to a direction of gravity.

14. The device of claim 11, wherein the controller is further configured to:
   determine, based on the analysis of the acceleration data, whether a variance of an acceleration of the device in a dimension is indicative of the aircraft having taken off.

15. The device of claim 14, wherein the dimension is parallel to a direction of gravity.

16. The device of claim 14, wherein the controller is further configured to:
   determine, based on the analysis of the acceleration data, whether a magnitude of the acceleration of the device in a plane orthogonal to the dimension is indicative of the aircraft having taken off.

17. The device of claim 11, wherein the controller is further configured to:
   switch operation of the communication module from a first mode to a second mode, wherein the first mode enables certain wireless communications of the communication module, and wherein the second mode disables the certain wireless communications of the communication module.

18. The device of claim 10, wherein the controller is configured to calibrate the orientation of the device by being further configured to generate a rotation matrix.

19. A non-transitory computer storage medium encoded with instructions that, when executed by one or more processors of a device, cause the one or more processors to perform operations comprising:
   receiving, by one or more processors from two or more sensors of the device, a first indication that an aircraft on which the device is aboard has taken off;
   performing quaternion calculations representative of an orientation of the device and a rotation of axes of the device;
   responsive to receiving the first indication and performing the quaternion calculations, activating, by the one or more processors, an airplane mode of the device;
   receiving, from the two or more sensors of the device while the device is in the airplane mode, a second indication that the aircraft is not in flight; and
   responsive to receiving the second indication, deactivating, by the one or more processors, the airplane mode of the device.

* * * * *